ated Jan. 10, 1922.

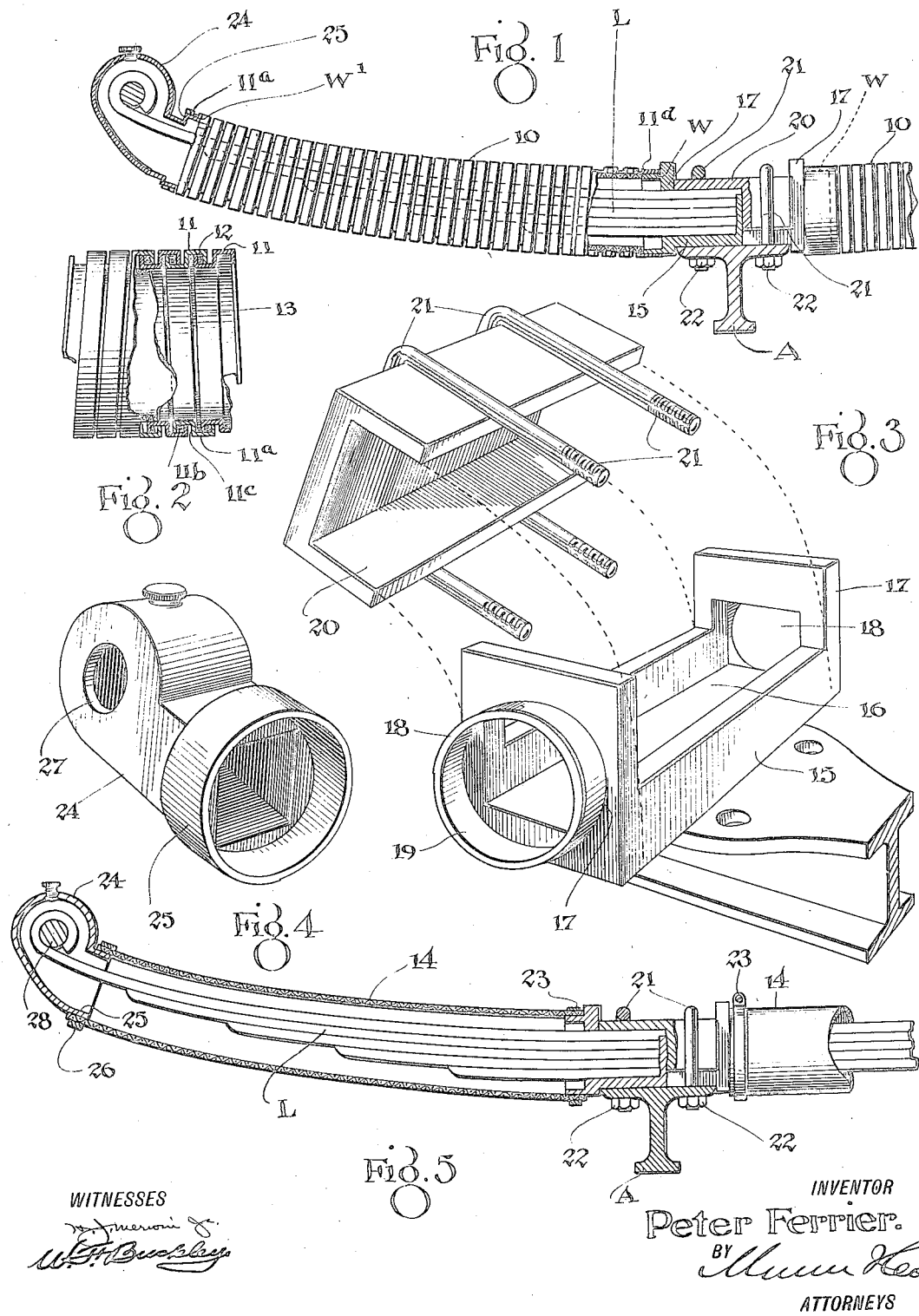

UNITED STATES PATENT OFFICE.

PETER FERRIER, OF BRISBANE, QUEENSLAND, AUSTRALIA.

SPRING.

1,403,153.   Specification of Letters Patent.   Patented Jan. 10, 1922.

Application filed September 11, 1920. Serial No. 409,559.

*To all whom it may concern:*

Be it known that I, PETER FERRIER, a subject of the King of Great Britain, and a resident of Brisbane, in the State of Queensland, Australia, have invented certain new and useful Improvements in Springs, of which the following is a specification.

This invention relates in general to springs, and more particularly to leaf springs.

The object of the invention is to provide a leaf spring which is so constructed and equipped that it is protected against the deleterious action and effects of rain, mud, grit or other foreign matter which ordinarily find its way to the spring and affords damage thereto; and which is of extremely simple and durable construction, reliable in operation and easy and inexpensive to manufacture, and repair and maintain.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a side elevational view, parts being broken away and shown in section for the sake of illustration, of the preferred form of the invention;

Figure 2 is a fragmentary detail view, partly in elevation and partly in section of the casing construction;

Figure 3 is a detail perspective view of the means employed to associate the inner ends of the casings with the leaf spring;

Figure 4 is a detail perspective view of the means employed to secure and associate the outer end of each of the casings with the respective outer ends of the leaf spring; and Figure 5 is a side fragmentary elevational view, parts being shown in section for the sake of illustration of a modified form of casing.

Referring now especially to Figures 1 and 5, it will be seen that the invention in both embodiments contemplates a leaf spring L which in the present instance is a vehicle spring and is seated upon the axle A of a vehicle.

In the form of my invention shown in Figures 1 and 2, a casing 10 is employed to completely encase, cover and protect each portion of the leaf spring on each side of the axle A, as shown in the drawings. As shown there is provided two or a pair of such casings for each leaf spring, each of said casings serving to protect and enclose approximately one half of the leaf spring. Each casing 10 comprises a flexible metallic construction of spiral form consisting of a plurality of convolutions 11 interconnected and interengaged with each other and rendered fluid-tight by means of asbestos packing 12. Each of the convolutions 11 consists of a pair of oppositely arranged U-shaped channels, designated at $11^a$ and $11^b$, respectively, the U-shaped channels having a common leg $11^c$ and being formed integral. The asbestos packing 12 is seated in the enclosed space defined by the interengaged channels of the convolutions, as clearly shown in Figure 2. The convolutions 11 which comprise the spiral flexible metallic casing are movable with respect to each other and permit the leaf spring to partake of its requisite movement when it partakes of its cushioning functions. Each of the end convolutions 11 have integrally formed therewith an annular flange $11^d$ for a purpose to be hereinafter more fully described. Each flexible metallic casing 10 is provided with a lining 13 of canvas or other suitable fabric which is interposed between the inner wall of the casing and the leaf spring.

In the form of my invention shown in Figure 5, the casing which is utilized to protect and enclose the leaf spring is constructed simply of heavy canvas or other suitable material, as designated at 14. As shown the canvas is of usual construction and two of such casings are employed for each leaf spring as in the foregoing.

Common means is provided for associating the inner end of each of the casings with the spring and for securing the spring to the axle. This means consists of a base or bed bracket 15 having a channel 16 therein and having upright end plates 17 integrally formed therewith and provided with alined openings 18 therein to accommodate the spring and annular flanges 19 surrounding each of said openings and receiving the inner ends of the casings. A channel clamp member 20 embraces the upper portion of the leaf spring and cooperates with the channel 16 of the bed bracket in securing the leaf spring on the axle, U-shaped bolts 21 and nuts 22 being utilized to retain the channel clamp and the bed bracket in position.

In the embodiment shown in Figure 1, the flanges 11$^a$ which constitute the inner ends of the flexible casings are welded onto the annular flanges 19, as designated at W. In the embodiment shown in Figure 4 the ends of the casing proper are received upon the respective flanges 19 and are retained thereon by means of a flat spring clamp 23 of conventional construction.

The outer ends of each of the casings are associated with the leaf spring by means of caps 24 which are fitted over and encase the outer ends of the leaf spring and which are each provided with an annular extension 25 over which the outer end of the casing fits and is secured. In the embodiment shown in Figure 1 the outer flanges 11$^d$ which constitute the outer ends of the casing are secured to the annular extension 25 by means of a weld W' while in the embodiment shown in Figure 5 the outer ends proper of the canvas casing are secured to similar annular extensions by means of a flat clamp 26. In both embodiments, the body portion of each cap 24 is provided with alined openings 27 which cooperate with a pivot bolt 28 used to connect the outer end of the spring to the frame or the like of the vehicle to support the cap 24 in position.

In practice it will be seen that the casing 10 in the embodiment shown in Figure 1 or the casing 14 in the embodiment shown in Figure 5 being secured in position on the spring as hereinabove described is effective to provide against the deleterious action of rain, mud, grit or other foreign matter as it prevents this foreign matter from coming into contact with the spring. The casing also preserves the lubricant of the spring and prevents waste or loss thereof. If desired the casing may be filled with oil or other lubricant so that the spring operates in oil. The casing being flexible in no way interferes with the action of the spring and in no way hinders its cushioning function but rather by preserving it in perfect condition and preventing injury thereof enhances the cushioning action of the spring. Moreover, the casing is highly organized with the spring as the means which is employed to secure the casing on the spring has the common function of securing the spring to the instrumentalities with which it is operatively associated.

If desired, the preferably flexible casing 10 may be made of a stiff and rigid construction so that the convolutions thereof will not be capable of partaking of relative movement with respect to each other. When such a construction of casing is employed, the ends thereof are not secured by welding or clamping to the annular extension of the cap or the annular flange of the upright plate but are disposed so as to be slidably mounted on these annuli. This slidable mounting of the inherent rigid casing provides for the motion necessary to allow the leaf spring to partake of the movements incident to its cushioning action.

I claim:

1. In a device of the character described, in combination with a leaf spring, a flexible casing of spiral form for the leaf spring consisting of interengaged metallic convolutions movable with respect to each other, the end convolutions of said casing each having an annular flange integral therewith, means for securing the inner end of the casing in position on the leaf spring including a metallic flange welded to the flange at the inner end of the casing, and means for securing the outer end of the casing in position on the leaf spring including an annular metallic element welded to the flange at the outer end of the casing.

2. In a device of the character described, in combination with a leaf spring, a flexible casing of spiral form for the leaf spring consisting of interengaged metallic convolutions movable with respect to each other, means for securing the inner end of the casing in position on the leaf spring including a metallic element welded to the inner end of the casing and means for securing the outer end of the casing in position on the leaf spring including a metallic element welded to the outer end of the casing.

3. In a device of the character described, in combination with a leaf spring, a flexible casing of spiral form for the leaf spring consisting of interengaged metallic convolutions movable with respect to each other, a canvas lining for said flexible metallic casing, means for securing the inner end of the casing in position on the leaf spring including a metallic element welded to the inner end of the casing, and means for securing the outer end of the casing in position on the leaf spring including a metallic element welded to the outer end of the casing.

4. In a device of the character described, in combination with a leaf spring, a flexible casing of spiral form for the leaf spring consisting of interengaged metallic convolutions movable with respect to each other; each of said convolutions comprising a pair of oppositely arranged U-shaped channels of integral constructions and having a common leg and asbestos packing disposed within the enclosed space defined by the interengaged channel members of the convolutions.

5. In a device of the character described, in combination with a leaf spring, a flexible casing of spiral form therefor consisting of interengaged metallic convolutions movable with respect to each other and asbestos packing for said convolutions, means for securing the inner end of the casing to the leaf spring; and means for securing the outer end of the casing to the spring.

6. In a device of the character described, in combination with a leaf spring and an axle, a pair of flexible casings for the leaf spring, common means for associating the inner ends of each of the casings with the leaf spring and for securing the leaf spring in position on the axle comprising a bed bracket having a channel, upright end plates integral with said channel and provided with alined openings to accommodate the spring and annular flanges carried on said plates surrounding said openings and receiving the inner end of the respective casing, a channel clamp cooperating with the channel of said base for securing the leaf spring, U-bolts and nuts for retaining said clamp and said bed bracket on said axle, and means for associating the outer end of each of said casings with the outer end of the leaf spring including a cap fitted over the leaf spring and having alined apertures in its body portion, and an annular extension received within the outer end of the casing, and a pivot pin extending through the alined apertures of said cap and adapted to connect the outer end of the leaf spring.

7. In a device of the character described, in combination with a leaf spring and an axle, a pair of flexible casings for the leaf spring, common means for associating the inner ends of each of the casings with the leaf spring and for securing the leaf spring in position on the axle comprising a bed bracket having a channel, upright end plates integral with said channel and provided with alined openings to accommodate the spring and annular flanges carried on said plates surrounding said openings and receiving the inner end of the respective casing, a channel clamp cooperating with the channel of said base for securing the leaf spring, U-bolts and nuts for retaining said clamp and said bed bracket on said axle, means for securing the ends of the respective casings on the respective annular flange, means for associating the outer end of each of said casings with the outer end of the leaf spring including a cap fitted over the leaf spring and having alined apertures in its body portion, an annular extension received with in the outer end of the casing, means for securing the outer end of the casing on the annular extension, and a pivot pin extending through the alined apertures of said cap and adapted to connect the outer end of the leaf spring.

8. In a device of the character described, in combination with a leaf spring, a pair of flexible casings adapted to encase the leaf spring, means for securing the inner ends of the casing to the leaf spring, and means for securing the outer ends of the casings to the leaf spring.

9. In a device of the character described, a flexible casing of spiral form adapted to encase the leaf spring and consisting of interengaged metallic convolutions, means for securing the inner end of the casing on the leaf spring including a bed bracket, a channel clamp adapted to coact with the bed bracket, fastening means for securing the channel clamp and bed bracket in position and an annular flange receiving the inner end of the casing and secured thereto, and means for securing the outer end of the casing on the leaf spring including a cap fitted over the outer end of the spring and having an annular extension receiving and secured to the outer end of the casing.

10. In a device of the character described, a flexible casing of spiral form adapted to encase the leaf spring and consisting of interengaged metallic convolutions, means for securing the inner end of the casing on the leaf spring including a bed bracket, a channel clamp adapted to coact with the bed bracket, fastening means for securing the channel clamp and bed bracket in position, an annular flange receiving the inner end of the casing and secured thereto, and means for securing the outer end of the casing on the leaf spring.

11. In a device of the character described, a flexible casing of spiral form adapted to encase the leaf spring and consisting of interengaged metallic convolutions, means for securing the inner end of the casing on the leaf spring and means for securing the outer end of the casing on the leaf spring including a cap fitted over the outer end of the spring and having an annular extension receiving and secured to the outer end of the casing.

PETER FERRIER.